US009935572B2

(12) United States Patent
Elie

(10) Patent No.: US 9,935,572 B2
(45) Date of Patent: Apr. 3, 2018

(54) CONTROL OF ALTERNATOR WITH FRONT END ACCESSORY DRIVE

(71) Applicant: Ford Global Technologies, LLC, Dearborn, MI (US)

(72) Inventor: Larry Dean Elie, Ypsilanti, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 232 days.

(21) Appl. No.: 15/057,513

(22) Filed: Mar. 1, 2016

(65) Prior Publication Data

US 2017/0257047 A1  Sep. 7, 2017

(51) Int. Cl.

| H02P 9/00 | (2006.01) |
|---|---|
| H02P 9/14 | (2006.01) |
| H02K 1/06 | (2006.01) |
| H02K 16/00 | (2006.01) |
| H02P 7/18 | (2006.01) |
| H02K 51/00 | (2006.01) |
| H02K 7/18 | (2006.01) |

(52) U.S. Cl.
CPC ............... *H02P 9/14* (2013.01); *H02K 1/06* (2013.01); *H02K 16/00* (2013.01); *H02K 51/00* (2013.01); *H02P 7/18* (2013.01); *H02K 7/1815* (2013.01)

(58) Field of Classification Search
CPC .... B60L 2220/50; H01H 50/16; H02K 16/00; H02K 51/00; H02K 1/06; H02P 7/18; H02P 9/14
USPC ............... 318/521, 538, 539, 716, 717, 720; 310/134, 140, 141, 149, 154.34; 417/1, 417/44.1, 44.11, 45
See application file for complete search history.

(56) References Cited

U.S. PATENT DOCUMENTS

| 3,797,242 | A | 3/1974 | Bowdish |
|---|---|---|---|
| 4,203,710 | A | 5/1980 | Farr |
| 5,650,679 | A | 7/1997 | Boggs, III et al. |
| 5,655,485 | A * | 8/1997 | Kusase ............... F04D 13/0666 123/41.31 |
| 5,821,658 | A | 10/1998 | Boggs, III |
| 6,394,250 | B1 | 5/2002 | Ouchi |
| 6,548,929 | B2 | 4/2003 | Nelson et al. |
| 7,057,315 | B2 | 6/2006 | Ishida et al. |
| 7,168,923 | B2 | 1/2007 | Vasilescu et al. |
| 7,291,948 | B2 | 11/2007 | Ishida |
| 7,999,501 | B2 * | 8/2011 | Atarashi ............... B60L 15/025 310/156.35 |
| 9,102,225 | B2 | 8/2015 | Major et al. |

(Continued)

FOREIGN PATENT DOCUMENTS

EP          0871281 A2        10/1998

OTHER PUBLICATIONS

Elie, Larry Dean, "Alternator With Front End Accessory Drive," U.S. Appl. No. 15/057,447, filed Mar. 1, 2016, 51 pages.

*Primary Examiner* — Bentsu Ro
*Assistant Examiner* — Thai Dinh
(74) *Attorney, Agent, or Firm* — Julia Voutyras; McCoy Russell LLP

(57) ABSTRACT

Control of alternator/starters for providing electrical power to a vehicle and rotating an engine is disclosed. In one example, the alternator/starter provides a differential action whereby torque on an input side of the alternator may be maintained while speed of an output side of the alternator may be varied. The alternator/starter includes two armature windings and two field windings.

20 Claims, 12 Drawing Sheets

(56) References Cited

U.S. PATENT DOCUMENTS

| | | | |
|---|---|---|---|
| 2007/0046124 A1* | 3/2007 | Aydin | H02K 1/2793 |
| | | | 310/156.37 |
| 2007/0252488 A1* | 11/2007 | Kusase | H02K 5/20 |
| | | | 310/68 D |
| 2008/0001495 A1* | 1/2008 | Qu | H02K 19/103 |
| | | | 310/268 |
| 2015/0035357 A1 | 2/2015 | Greene | |

* cited by examiner

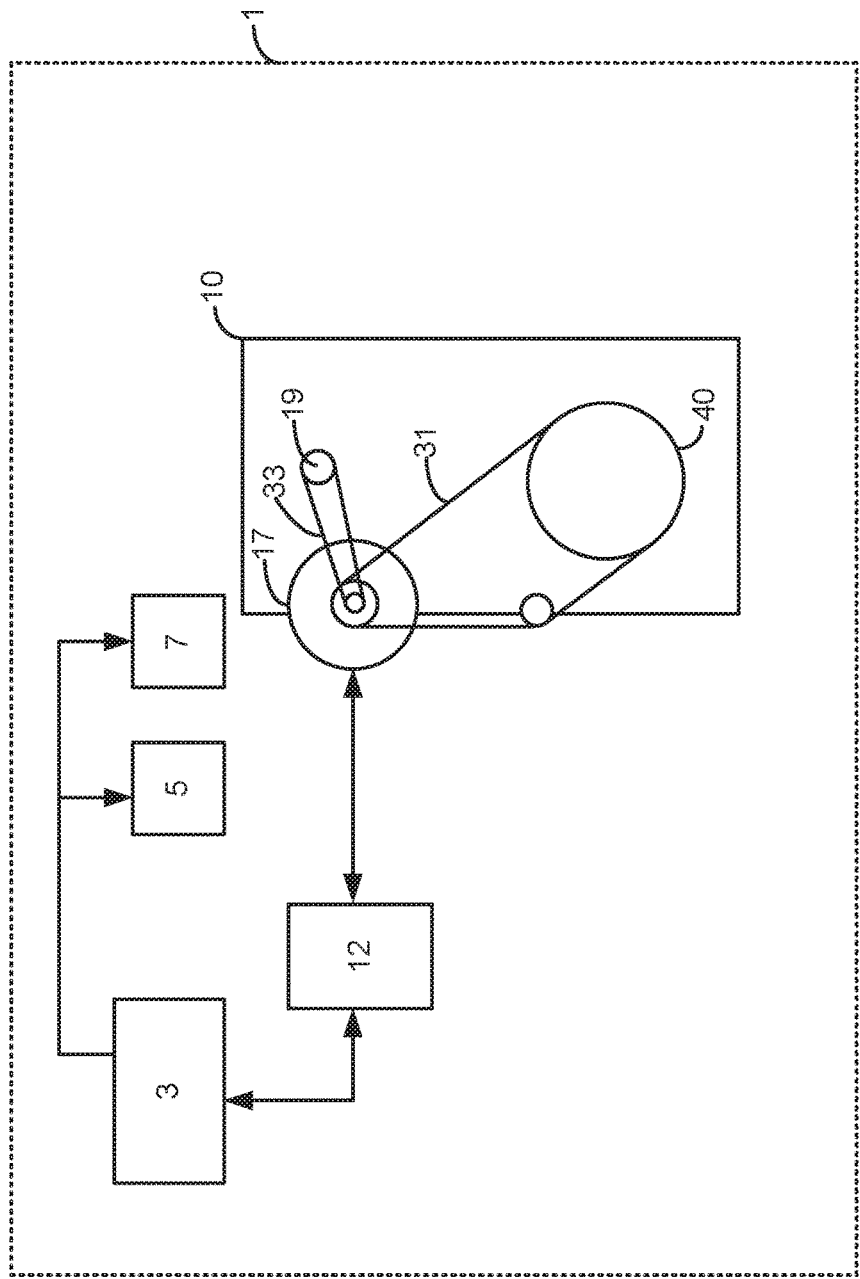

US 9,935,572 B2

CONTROL OF ALTERNATOR WITH FRONT END ACCESSORY DRIVE

FIELD

The present description relates to systems and methods for a vehicle alternator or generator. The methods may be particularly useful for compound alternators that provide electrical power to vehicle electrical loads and transfer rotational energy from an engine to mechanically driven accessory devices.

BACKGROUND AND SUMMARY

A vehicle may include an alternator for converting mechanical energy into electrical energy. The electrical energy produced by the alternator may be stored in an electrical energy storage device for future consumption or the electrical energy may be consumed by electrically powered devices as the electrical energy is produced. Recently, electrical loads within the vehicle have increased and are expected to increase further as autonomous vehicles are put into production. For example, some vehicles include electrically assisted steering and electrically driven climate control systems. Autonomous vehicles may include object and distance observing sensors as well as enhanced communications systems and actuators to position, stop, and accelerate the vehicle. The electrical loads may increase well beyond that which a medium duty alternator may provide. Further, a speed of an engine driving the alternator may vary such that the engine drives the alternator at speeds where the alternator operates less efficient than may be desired. Further still, the engine speed may operate front end accessory devices (FEAD) at speeds that may be less efficient. Consequently, the alternator electrical output may be at times insufficient to supply the electrical load unless the alternator is sized large and FEAD devices may be less efficient than is desired. However, increasing the alternator size may increase vehicle mass, thereby decreasing vehicle fuel efficiency. Further, installing a clutch between FEAD accessories and the engine may decrease driveline efficiency. As such, it would be desirable to provide an alternator that has high output capacity with a reduced mass and a variable speed FEAD driving device.

The inventor herein has recognized the above-mentioned disadvantages of a conventional alternator and has developed an electrical machine, comprising: a housing; a first field winding within the housing; a first armature winding; a second field winding, the first field winding and the first armature winding at least partially wrapped by the second field winding; a second armature winding, the first field winding and the first armature winding at least partially wrapped by the second armature winding; and a controller including non-transitory instructions to adjust current supplied to the second field winding to control a speed of a front end accessory device.

By adjusting current supplied to a second field winding of an electrical machine providing electrical energy to electrical consumers, it may be possible to provide the technical result of providing improved front end accessory drive speed control. For example, if engine output increases, current supplied to a field of an alternator may be increased to increase water pump speed or speed of other front end accessory devices (FEAD). In this way, water pump output may be increased to provide additional cooling even if engine speed is constant.

The present description may provide several advantages. In particular, the electric machine may improve FEAD device speed control. Further, driveline efficiency may be improved by operating FEAD devises in a desired speed range while engine speed changes. Further still, the mechanical output and electrical output of the electric machine may be tailored to improve vehicle driveline efficiency.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The advantages described herein will be more fully understood by reading an example of an embodiment, referred to herein as the Detailed Description, when taken alone or with reference to the drawings, where:

FIGS. 1A and 1B show an alternator/starter incorporated into a powertrain of a vehicle;

DETAILED DESCRIPTION

Figure 1B:
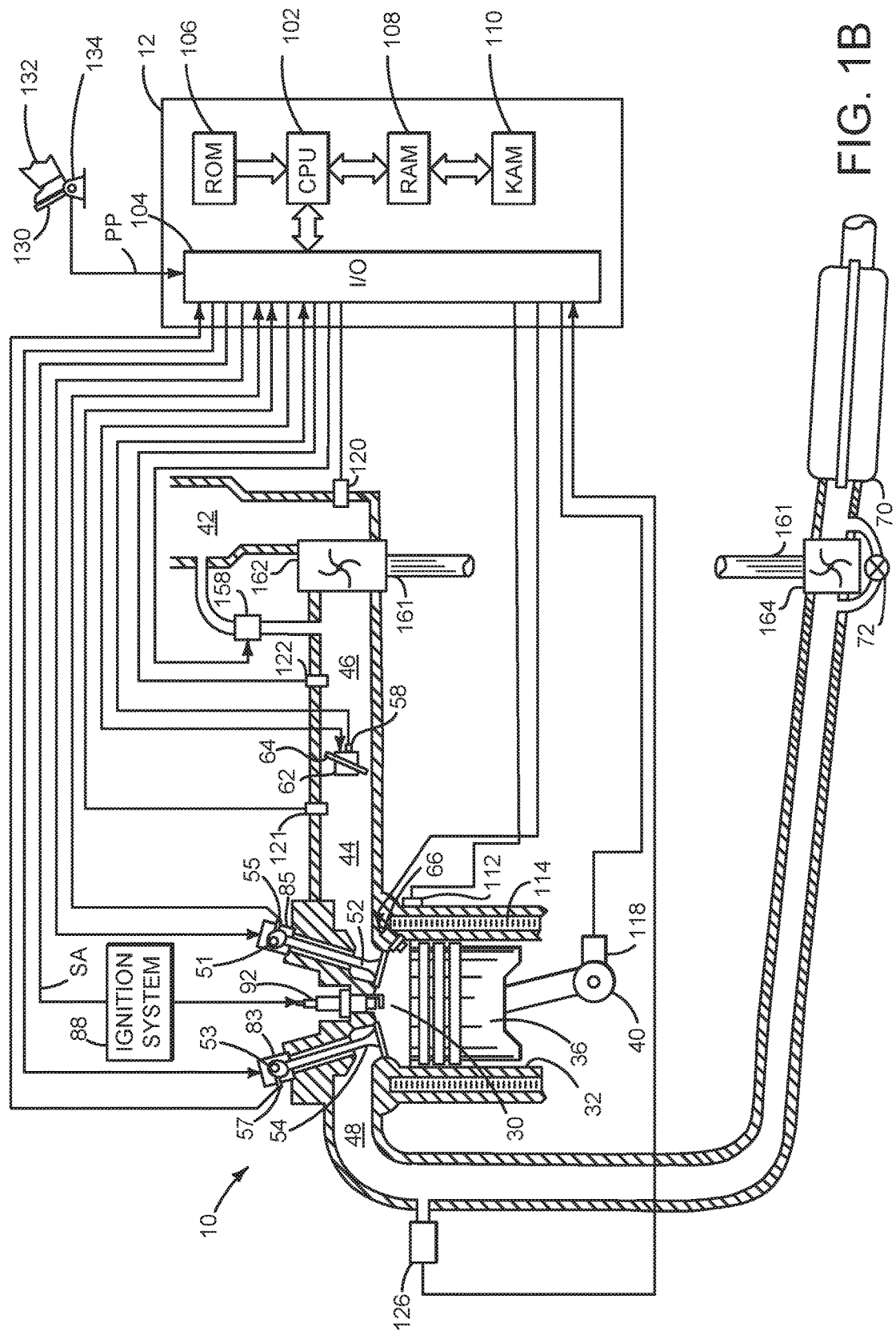

The present description is related to an electric machine. The electric machine may be operated as an alternator or as a starter. The electric machine may be incorporated into a vehicle powertrain as is shown in FIGS. 1A and 1B. The alternator/starter may be configured as is shown in FIGS. 2A-4C. The alternator/starter may be operated as is shown in FIG. 5 according to the method shown in FIG. 6.

Referring to FIG. 1A, a schematic diagram of an alternator/starter in a vehicle system is shown. Vehicle 1 includes an engine 10, a controller 12, an electric energy storage device 3, and electrical power consumers 5 and 7. Electrical power consumers may include navigation systems as well as electric braking actuators, electric steering actuators, object and distance sensing devices, engine torque actuators such as electrically operated throttles, engine cooling fans, electric water pumps, heat pump compressors, and vehicle climate control systems.

Alternator/starter 17 is mechanically coupled to an engine shaft 21 via chain or belt 31. In some examples, shaft 21 may be a crankshaft while in other examples shaft 21 may be a camshaft. Alternator/starter 17 is also mechanically coupled to mechanically drive ancillary device 19 via belt 33 to provide a front end accessory drive (FEAD). The mechanically driven ancillary device may be a water pump, power steering pump, vacuum pump, air pump, or other mechanically driven device (e.g., FEAD devices). In some examples, alternator/starter 17 may be referred to as a compound alternator/starter since it includes multiple armature windings and field windings.

Referring to FIG. 1B, internal combustion engine 10, comprising a plurality of cylinders, one cylinder of which is shown in FIG. 1B, is controlled by electronic engine controller 12. Engine 10 includes combustion chamber 30 and cylinder walls 32 with piston 36 positioned therein and connected to crankshaft 40. Combustion chamber 30 is shown communicating with intake manifold 44 and exhaust manifold 48 via respective intake valve 52 and exhaust valve 54. Each intake and exhaust valve may be operated independently with respect to valves of other cylinders via intake cam 51 and an exhaust cam 53. Intake valve adjuster 85 advances or retards the phase of intake valve 52 relative to a position of crankshaft 40. Additionally, intake valve adjuster 85 may increase or decrease an intake valve lift amount. Exhaust valve adjuster 83 advances or retards the phase of exhaust valve 54 relative to a position of crankshaft 40. Further, exhaust valve adjuster 83 may increase or decrease an exhaust valve lift amount. The position of intake cam 51 may be determined by intake cam sensor 55. The position of exhaust cam 53 may be determined by exhaust cam sensor 57.

Fuel injector 66 is shown positioned to inject fuel directly into cylinder 30, which is known to those skilled in the art as direct injection. Alternatively, fuel may be injected to an intake port, which is known to those skilled in the art as port injection. Intake manifold 44 is shown communicating with optional electronic throttle 62 which adjusts a position of throttle plate 64 to control air flow from boost chamber 46 to intake manifold 44. In some examples, throttle 62 and throttle plate 64 may be positioned between intake valve 52 and intake manifold 44 such that throttle 62 is a port throttle. Compressor 162 supplies air from air intake 42 to boost chamber 46. Compressor 162 is driven by shaft 161 which is mechanically coupled to turbine 164. Compressor bypass valve 158 may be selectively operated to reduce boost pressure. Waste gate 72 may be selectively opened and closed to control the speed of turbine 164.

Driver demand torque may be determined from a position of accelerator pedal 130 as sensed by accelerator pedal sensor 134. A voltage or current indicative of driver demand torque is output from accelerator pedal sensor 134 when driver's foot 132 operates accelerator pedal 130.

Distributorless ignition system 88 provides an ignition spark to combustion chamber 30 via spark plug 92 in response to controller 12. Universal Exhaust Gas Oxygen (UEGO) sensor 126 is shown coupled to exhaust manifold 48 upstream of turbine 164 and catalytic converter 70. Alternatively, a two-state exhaust gas oxygen sensor may be substituted for UEGO sensor 126. Converter 70 can include multiple catalyst bricks, in one example. In another example, multiple emission control devices, each with multiple bricks, can be used. Converter 70 can be a three-way type catalyst in one example.

Controller 12 is shown in FIG. 1B as a conventional microcomputer including: microprocessor unit 102, input/output ports 104, read-only (non-transitory) memory 106, random access memory 108, keep alive memory 110, and a conventional data bus. Controller 12 is shown receiving various signals from sensors coupled to engine 10, in addition to those signals previously discussed, including: engine coolant temperature (ECT) from temperature sensor 112 coupled to cooling sleeve 114; a measurement of engine manifold pressure (MAP) from pressure sensor 121 coupled to intake manifold 44; a measurement of boost pressure from pressure sensor 122; an engine position sensor from a Hall effect sensor 118 sensing crankshaft 40 position; a measurement of air mass entering the engine from sensor 120; and a measurement of throttle position from sensor 58. Barometric pressure may also be sensed (sensor not shown) for processing by controller 12.

During operation, each cylinder within engine 10 typically undergoes a four stroke cycle: the cycle includes the intake stroke, compression stroke, expansion stroke, and exhaust stroke. During the intake stroke, generally, the exhaust valve 54 closes and intake valve 52 opens. Air is introduced into combustion chamber 30 via intake manifold 44, and piston 36 moves to the bottom of the cylinder so as to increase the volume within combustion chamber 30. The position at which piston 36 is near the bottom of the cylinder and at the end of its stroke (e.g., when combustion chamber 30 is at its largest volume) is typically referred to by those of skill in the art as bottom dead center (BDC). During the compression stroke, intake valve 52 and exhaust valve 54 are closed. Piston 36 moves toward the cylinder head so as to compress the air within combustion chamber 30. The point at which piston 36 is at the end of its stroke and closest to the cylinder head (e.g., when combustion chamber 30 is at its smallest volume) is typically referred to by those of skill in the art as top dead center (TDC).

In a process hereinafter referred to as injection, fuel is introduced into the combustion chamber. In a process hereinafter referred to as ignition, the injected fuel is ignited by known ignition means such as spark plug 92, resulting in combustion. During the expansion stroke, the expanding gases push piston 36 back to BDC. Crankshaft 40 converts piston movement into a rotational torque of the rotary shaft. Finally, during the exhaust stroke, the exhaust valve 54 opens to release the combusted air-fuel mixture to exhaust manifold 48 and the piston returns to TDC. Note that the above is shown merely as an example, and that intake and exhaust valve opening and/or closing timings may vary, such as to provide positive or negative intake and exhaust valve opening overlap, late intake valve closing, or various other examples.

Figure 2A:
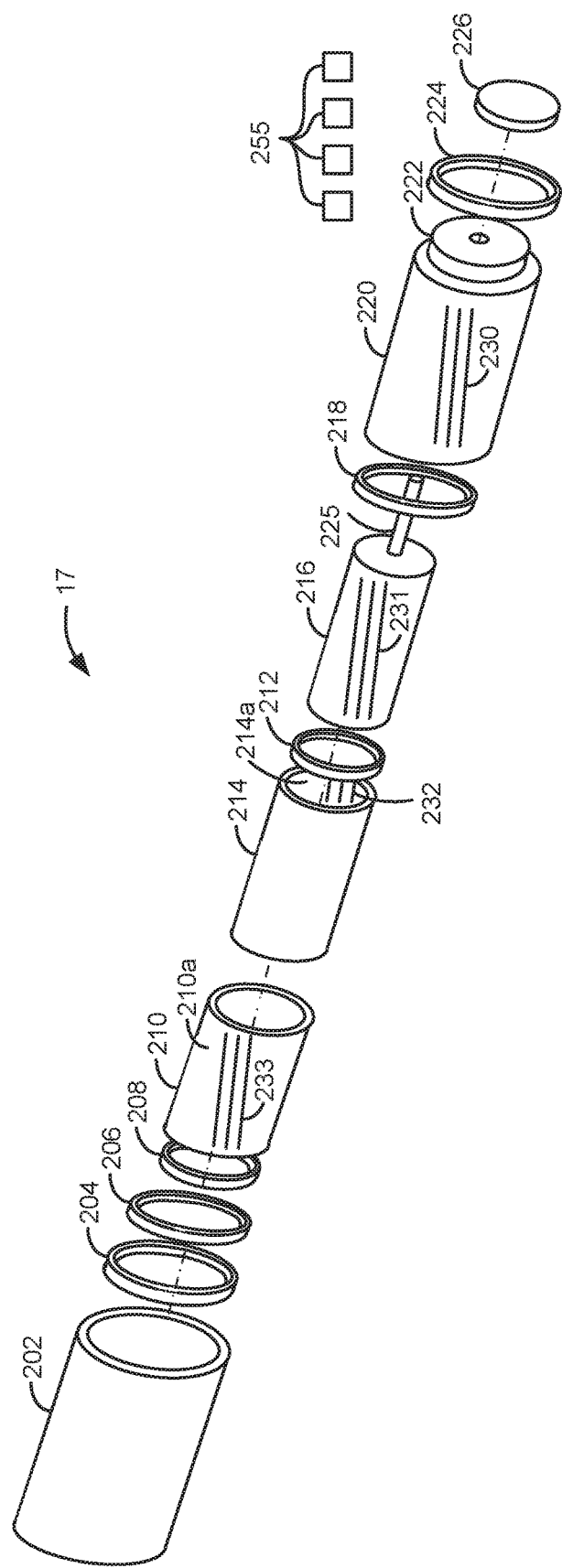
FIGS. 2A-4C show example alternators/starters that may be incorporated into the system of FIGS. 1A and 1B.
Figure 2B:
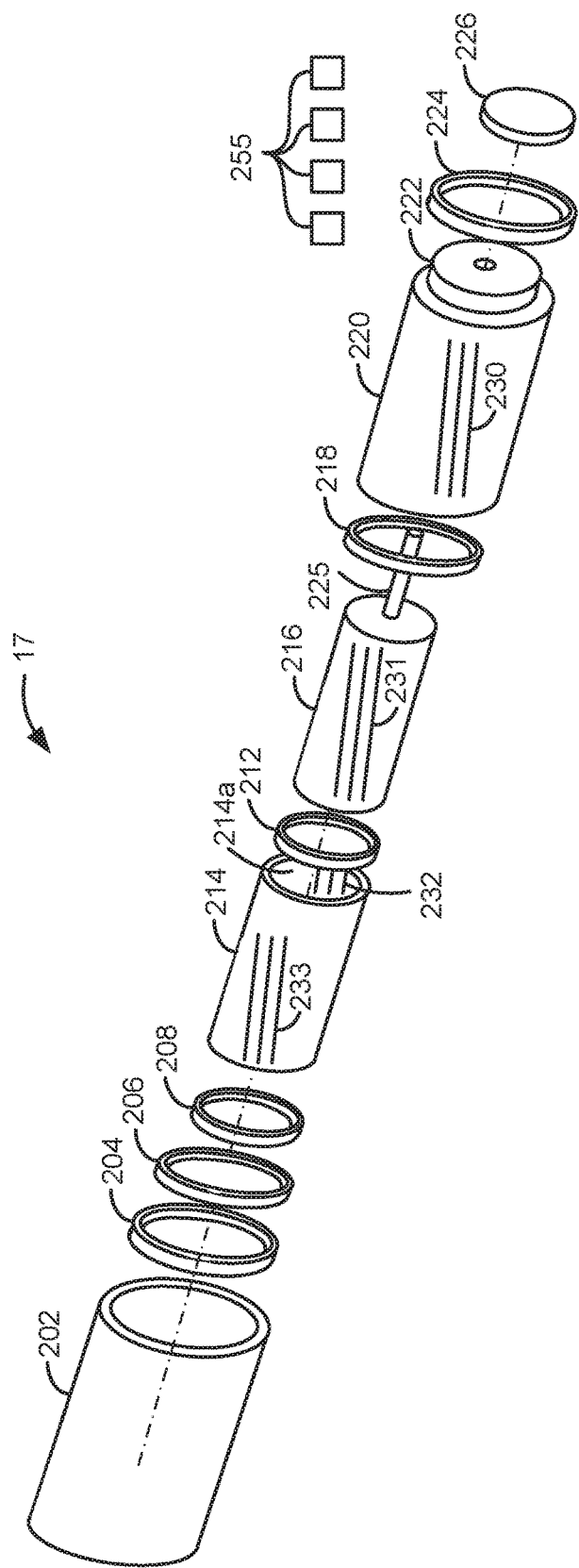
Figure 2C:
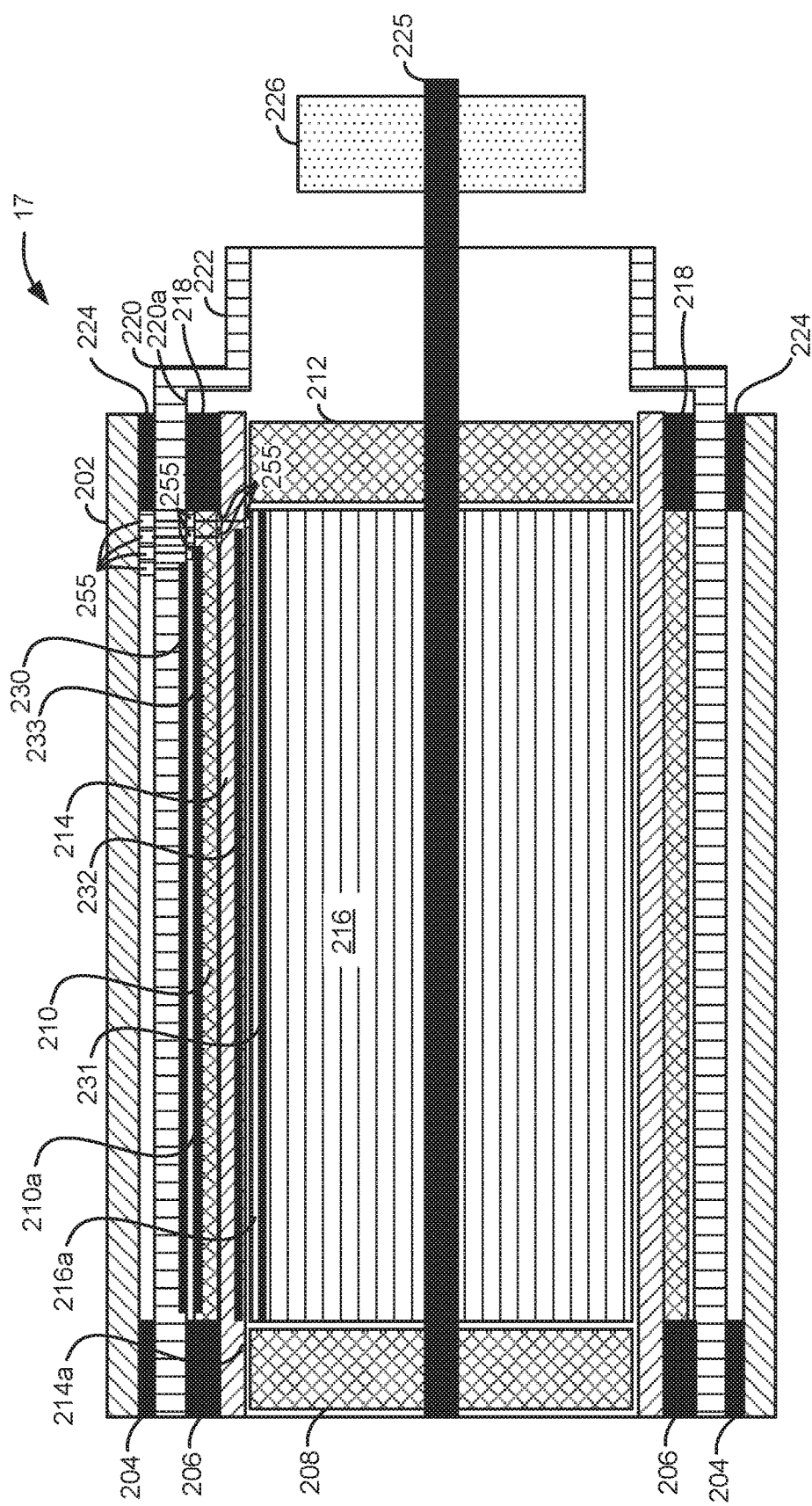

Referring now to FIGS. 2A and 2C, FIG. 2A shows an exploded view of a first alternator/starter 17. FIG. 2B shows an exploded view of an alternative alternator/starter 17. FIG. 2C shows a cross section of starter/alternator 17 shown in FIG. 2A. The alternators/starters shown in FIGS. 2A-4C may operate in a first mode as an alternator providing electrical power to vehicle systems as shown in FIG. 1A. The alternators/starters shown in FIGS. 2A-4C may operate in a second mode as a starter to rotate engine 10. In some examples, permanent magnets may be substituted for one or more windings of the different alternator/starter configurations.

Alternator/starter 17 includes a housing 202 which at least partially wraps to at least partially enclose field windings and armature windings. Bearings 204 and 224 are pressed into housing 202 to support second field winding support 220 and second field winding 230. Bearings 206 and 218 are pressed into second field winding support 220 to support second armature support 210, second armature winding 233 and first field support 214. First field support 214 is pressed into second armature support 210 so that first field support 214 rotates with second armature support 210. Second armature Bearings 208 and 212 are pressed into first field support 214 to support first armature support 216 and first armature winding 231. Bearings 208 and 212 also support shaft 225 and pulley 226. Second field support 220 also includes a pulley 222.

Second field winding 230 is coupled to and positioned on an inside 220a of second field support 220. Second armature winding 233 is coupled to and positioned on an outside 210a of second armature support 210. First field winding 232 is coupled to and positioned on an inside 214a of first field support 214. First armature winding 231 is coupled to and positioned on an outside 216a of first armature support 216. Slip rings 225, or alternatively brushes or conductive grease through bearing contacts, provide electrical connections between rotating field windings and armature windings and housing 202 where an electrical connector (not shown) provides an electrical coupling between alternator/starter 17 and controller 12.

It should be noted that in some examples second field winding 230 may instead be configured as a second armature winding. Further, second armature winding 233 may instead be configured as a second field winding when second field winding 230 is configured as a second armature winding. The second field winding 230 and second armature winding 233 comprise a second alternator/starter within alternator/starter 17. Likewise, first field winding 232 may instead be configured as a second armature winding. Further, first armature winding 231 may instead be configured as a first field winding when first field winding 232 is configured as a first armature winding. The first field winding 232 and first armature winding 231 comprise a first alternator/starter within alternator/starter 17. Thus, alternator/starter 17 is a compound electrical machine comprised of a first alternator/starter and a second alternator/starter.

Pulley 222 may be driven by engine 10 of FIG. 1A to rotate second field support 220. Pulley 226 may be mechanically coupled to FEAD devices. Alternatively, engine 10 may drive pulley 226 and pulley 222 may be mechanically coupled to FEAD devices. Second armature support 210, first armature support 216, and first field support 214 do not rotate when there is zero current flow through second field winding 230. However, by flowing current through second field winding 230 when second field support 220 is rotated by engine 10 of FIG. 1A, a voltage may be induced in second armature winding 233. The induced voltage in the second armature winding 233 may be used to supply electrical power to an electric energy storage device or vehicle electrical consumers. Further, field current in second field winding 232 produces a magnetic field which provides a counter torque to engine rotation. The counter torque also causes the first field support 214 to rotate when a voltage is induced in the second armature winding 233 because the first field support 214 is mechanically coupled to the second armature support 210, which is mechanically coupled to the second armature winding 233. If current is supplied to first field winding 232 while the first field support 214 is rotated by the counter torque produced via the second field winding 230, a magnetic field is generated which provides a counter torque to second armature support 210 rotation. The counter torque also causes the first armature support 216 to rotate when a voltage is induced in the first armature winding 231. The induced voltage in the first armature winding 231 may be used to supply electrical power to an electric energy storage device or vehicle electrical consumers. The first armature support 216 rotates pulley 226 via shaft 225. Armature winding support 216 does not rotate if field current does not flow through first field winding 232.

If pulley 226 is driven via engine 10, pulley 22 may provide torque to FEAD devices when current is supplied to winding 231 and winding 233. In this condition, voltage induced in winding 232 and winding 230 may be supplied to the vehicle electrical system for electric energy storage device charging and operating vehicle electrical loads.

Pulley 222 is shown as having a larger diameter than pulley 226, but the pulley diameters may be made equivalent or pulley 226 may have a diameter larger than pulley 222 depending on design objectives and a desired speed range of mechanically driven accessory devices.

Five example cases for the alternator/starters included herein are provided. It may be assumed the alternators are 90% efficient. Typical belt driven air conditioning (AC) compressors are sized for the maximum cooling load, which may be initial cooling of a hot soaked car. The mechanical load of an AC system may reach 8 kW for some systems. Higher efficiency AC systems may operate at 5 kW, but an actual continuous power consumption average over many cycles may be under 1 kW. A minimum electrical requirement for a typical vehicle may be 350 W. The average electrical requirement may be from 750 to 1000 W. However, an autonomous vehicle may have a minimum electrical requirement of 2.5 kW and a typical operating requirement of over 3 kW.

As a first example, operation of the alternator/starter in an autonomous vehicle that consumes significant electrical power is described. A vehicle day time driving load with modest air conditioning (AC) load includes 2.5 kW (e.g., electrical load) of electrical power consumption and a FEAD load of 900 W (e.g., mechanical load applied to the alternator/starter) comprising 750 W to drive the AC compressor, 100 W to drive a water pump, and 50 Watts.

Thus, the mechanical load amounts to 900 W and the electrical load amounts to 2.5 kW to be output from the alternator/starter 17. The alternator/starter operating as an alternator and mechanical FEAD drive operates at 90% electrical efficiency. Therefore, the mechanical load to provide the electrical output is 2.78 kW. The total minimum mechanical power needed to be applied to the alternator/starter to deliver power to the FEAD and electrical system is 900 W+2.78 kW=3.68 kW of mechanical power input into the alternator/starter.

The mechanical FEAD load is applied to the alternator/starter mechanical output (e.g., second alternator). The second alternator consumes 900 W of mechanical power to drive only the FEAD devices. If power input to the first and second alternators is balanced to provide equal power output from the two alternators, the first and second alternator consumes 3.68 kW/2 or 1.84 kW to provide the FEAD power and electrical power output. If the first alternator loads 1.84 kW mechanical power to the alternator input on order to output 1.66 kW electrical output, the second alternator mechanically coupled to the FEAD may be operated to deliver 1.84 kW−900 W=940 W times 0.9 or 0.846 kW electrical output and 900 W of mechanical output to the FEAD. In this way, the power output of the first alternator (e.g., electrical power) and the power output from the second alternator (e.g., electrical and mechanical power) may be equalized.

As a second example, another autonomous vehicle, night time load, winter (no AC). The electrical consumption by vehicle electrical accessories is 2.75 kW. The vehicle's mechanical accessories are mechanically coupled to the alternator/starter via the FEAD including 50 W of water pump load, and 50 W of power steering load. The mechanical load coupled to the alternator starter is 50 W (water pump) plus 50 W (power steering). If the alternator starter is 90% efficient producing electrical power, the mechanical load to the alternator/starter to provide the electrical power is 2.75 kW/0.9=3.05 kW. The total minimum mechanical power applied to the alternator/starter to deliver the electrical and mechanical power is 100 W (e.g., FEAD load)+3.05 kW (e.g., electrical power)=3.15 kW.

To balance the power output of the first and second alternators of the alternator/starter 17, each alternator should consume 3.15 kW/2 or 1.575 kW of power to provide the desired output power. If the first alternator loads 1.575 kW of mechanical power to the alternator/starter input to provide 1.42 kW of electrical output, the second alternator mechanically coupled to the FEAD may be operated to deliver 1.575 kW−100 W=1.475 kW times 0.9 or 1.3275 kW electrical output and 100 W of mechanical output to the FEAD.

As a third example, a vehicle without autonomous driving capability driving at night may consume 1000 W (Watts) of electrical power. The mechanical FEAD load may be 50 W consumed by a water pump and 50 W consumed by power steering. At 90% efficiency, the mechanical load for the alternator/starter 17 to provide 1000 W of electrical power is 1.11 kW. Therefore, the minimum mechanical power input to alternator/starter to operate the FEAD and provide the electrical power is 100 W+1.11 kW=1.21 kW.

The power output via the first and second alternators of alternator/starter 17 may be balanced by dividing 1.21 kW by 2 which equals 0.605 kW. If the first alternator loads 0.605 kW of mechanical power to the alternator/starter input to provide 0.5445 kW of electrical output, the second alternator mechanically coupled to the FEAD may be operated to deliver 0.605 kW−100 W=0.505 kW times 0.9 or 0.4545 kW of electrical output and 100 W of mechanical output to the FEAD.

In a fourth example, the vehicle day time electrical load may be 800 W. At 90% efficiency, the mechanical load to alternator/starter 17 to provide 800 W of electrical power is 889 W. The mechanical FEAD load may be 750 W consumed by AC, 100 W consumed by a water pump, and 50 W consumed by power steering for a total of 900 W of mechanical power output from the alternator/starter. As a result, the minimum mechanical power input to the alternator/starter to operate the FEAD and provide the electrical power is 900 W plus 889 W=1.79 kW.

The power output via the first and second alternators of alternator/starter 17 may be balanced by dividing 1.79 kW by 2 which equals 895 W. If the first alternator loads 895 W of mechanical power to the alternator/starter input to provide 805.5 W of electrical output, the second alternator mechanically coupled to the FEAD may be operated to deliver 895 W−900 W=−5 W of power. Thus, the desired electrical output may not be provided with first and second alternator outputs being balanced. One solution for this case might be to put one load on the input side of the first alternator (e.g., the water pump).

As a fifth example, a vehicle without autonomous driving capability driving in day light may include an electrical load of 750 W. The mechanical FEAD load may be 5000 W consumed by AC, 150 W consumed by a water pump, and 50 W consumed by power steering. At 90% efficiency, the mechanical load for the alternator/starter 17 to provide 750 W of electrical power is 833.3 W. Therefore, the minimum mechanical power input to the alternator/starter to operate the FEAD and provide the electrical power is 5.2 kW+833.3=6.03 kW.

The power output via the first and second alternators of alternator/starter 17 may be balanced by dividing 6.03 kW by 2 which equals 3.02 kW. If the first alternator loads 3.02 kW of mechanical power to the alternator/starter input to provide 2.72 kW of electrical output, the second alternator mechanically coupled to the FEAD may be operated to deliver 3.02 kW−5.2 kW=−2.18 kW times 0.9 or −1.962 kW of electrical output. Therefore, it may be desirable to operate the second alternator as a motor to drive the FEAD while the first alternator operates as an alternator.

Referring now to FIG. 2B, shows an alternative alternator/starter. The alternator/starter 17 of FIG. 2B includes all the same components of the example alternator/starter shown in FIG. 2A, except in this example, first field support 214 provides support for first field winding 232 and second armature winding 233. Therefore, for the sake of brevity, the description of each component is not repeated. First field winding 232 is positioned on an inside 214a first field support 214. Second alternator winding 233 is positioned on an outside 214b of first field support 214. The alternator/starter of FIG. 2B operates in a same way as alternator/starter 17 of FIG. 2A. Thus, the alternator/starter 17 of FIG. 2B omits the second armature support of the alternator/starter shown in FIG. 2A.

Referring now to FIG. 2C, a longitudinal cross section of alternator/starter 17 of FIG. 2A is shown. The numbing of alternator/starter components is the same used in FIG. 2A. Further, FIG. 2C shows one example way slip rings 255 may provide an electrical communication path between housing 202 and the field and armature windings 230-233. Multiple slip rings may be used to provide an electrical current path from an electrical connector (not shown) in housing 202 to the first field winding 232, the second armature winding 233, and the first armature winding 231. The slip rings providing a path from the electrical connector to the windings may be coupled via conductors.

Figure 3A:
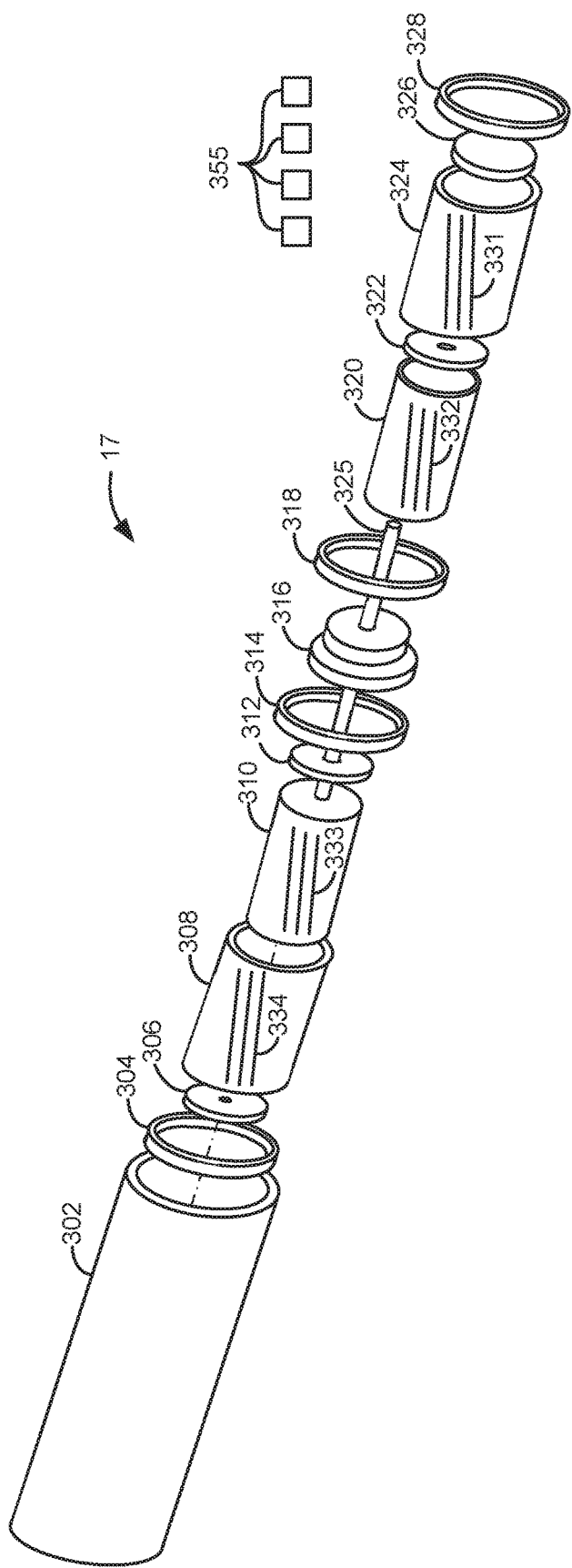
Figure 3B:
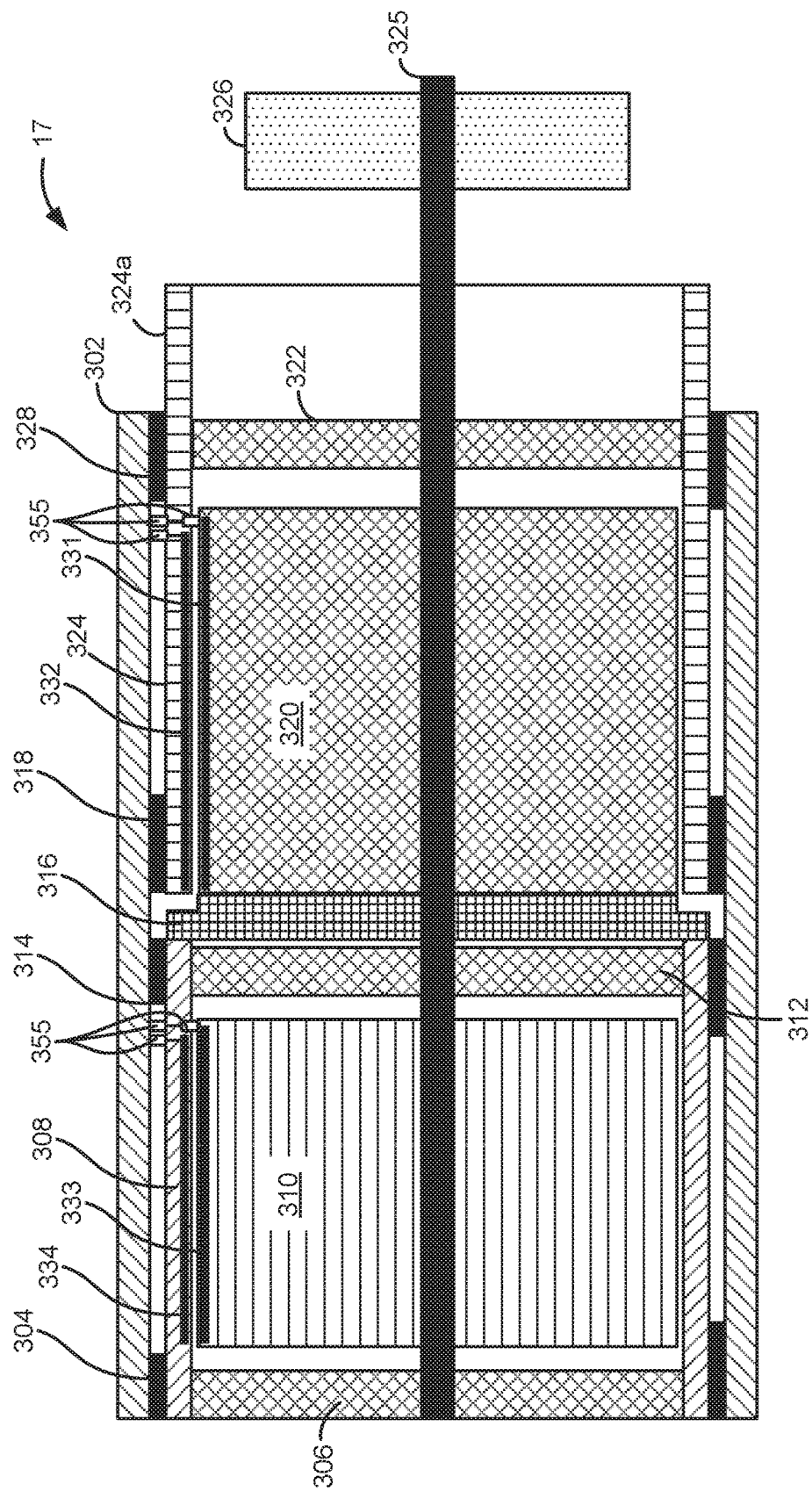

Referring now to FIGS. 3A and 3B, another alternative alternator/starter is shown. This example alternator/starter may provide similar electrical and mechanical power output as the alternator/starter shown in FIG. 2A using a smaller diameter housing.

Bearings 304, 314, 318, and 328 are pressed into housing 302 to provide support for first field winding support 308 and second field winding support 324. Bearings 306, 312, and 322 are pressed into first field winding support 308 and second field winding support 324 to provide support for first armature support 310 and second armature support 320. Bearings 306, 312, and 322 also support shaft 325. Engine 10 may be mechanically coupled to pulley section 324a of second field support 324 to drive the second field support 324. Pulley 326 is mechanically coupled to shaft 325 and it may drive FEAD devices via a belt or chain. Alternatively, Pulley 326 may be driven via engine 10 and pulley section 324a may drive FEAD devices via a belt or chain.

First field winding 334 is coupled to first field winding support 308. First armature winding 333 is coupled to first armature winding support 310. Coupler 316 mechanically couples first field winding support 308 to second armature support 320 so that first field winding support 308 rotates at a same speed as second armature support 320. Second armature winding 332 is coupled to second armature support 320. Second field winding 331 is coupled to second field winding support 324. Slip rings 355, or alternatively brushes or conductive grease through bearing contacts, provide electrical connections between rotating field windings and armature windings and housing 302 where an electrical connector (not shown) provides an electrical coupling between alternator/starter 17 and controller 12.

It should be noted that in some examples second field winding 331 may instead be configured as a second armature winding. Further, second armature winding 332 may instead be configured as a second field winding when second field winding 331 is configured as a second armature winding.

The second field winding 331 and second armature winding 332 comprise a second alternator/starter within alternator/starter 17. Likewise, first field winding 334 may instead be configured as a second armature winding. Further, first armature winding 333 may instead be configured as a first field winding when first field winding 334 is configured as a first armature winding. The first field winding 334 and first armature winding 333 comprise a first alternator/starter within alternator/starter 17. Thus, alternator/starter 17 is a compound electrical machine comprised of a first alternator/starter and a second alternator/starter.

Second armature support 320, first armature support 310, and first field support 308 do not rotate when there is zero current flow through second field winding 331 and second field support 324 is driven by engine 10. However, by flowing current through second field winding 331 when second field support 324 is rotated by engine 10 of FIG. 1A, a voltage may be induced in second armature winding 332. The induced voltage in the second armature winding 332 may be used to supply electrical power to an electric energy storage device or vehicle electrical consumers. Further, flowing field current in second field winding 334 produces a magnetic field which provides a counter torque to engine rotation. The counter torque also causes the first field support 308 to rotate when a voltage is induced in the second armature winding 332 because the first field support 308 is mechanically coupled to the second armature support 320 via coupler 316. If current is supplied to first field winding 334 while the first field support 308 is rotated by the counter torque produced via the second field winding 331 current, a magnetic field is generated which provides a counter torque to rotate first armature support 310. The counter torque also causes the first armature support 310 to rotate when a voltage is induced in the first armature winding 333 from the first field winding 331 current. The induced voltage in the first armature winding 333 may be used to supply electrical power to an electric energy storage device or vehicle electrical consumers. The first armature support 310 rotates pulley 326 via shaft 325. Armature winding support 310 does not rotate if field current does not flow through first field winding 334.

Pulley 324a is shown as having a larger diameter than pulley 326, but the pulley diameters may be made equivalent or pulley 326 may have a diameter larger than pulley 324a depending on design objectives and a desired speed range of mechanically driven accessory devices.

If pulley 326 is driven via engine 10, pulley 324a may provide torque to FEAD devices when current is supplied to winding 333 and winding 332. In this condition, voltage induced in winding 334 and winding 331 may be supplied to the vehicle electrical system for electric energy storage device charging and operating vehicle electrical loads.

Figure 4A:
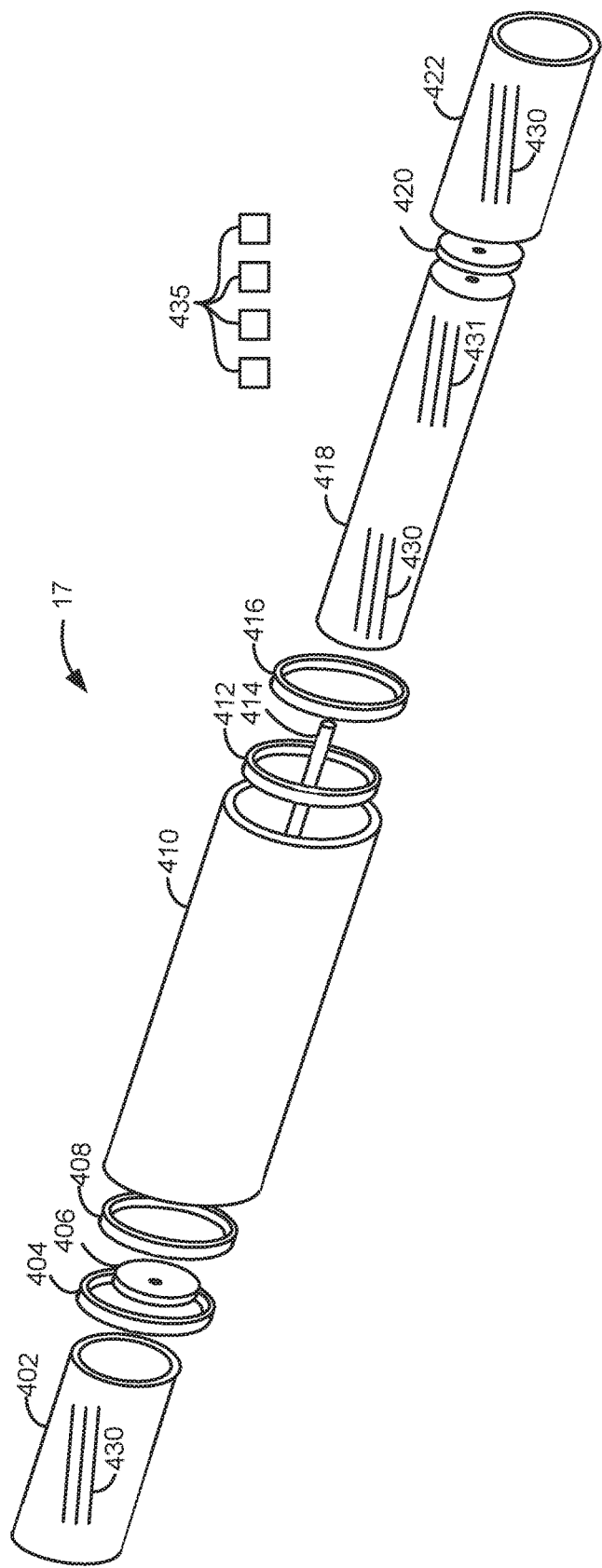
Figure 4B:
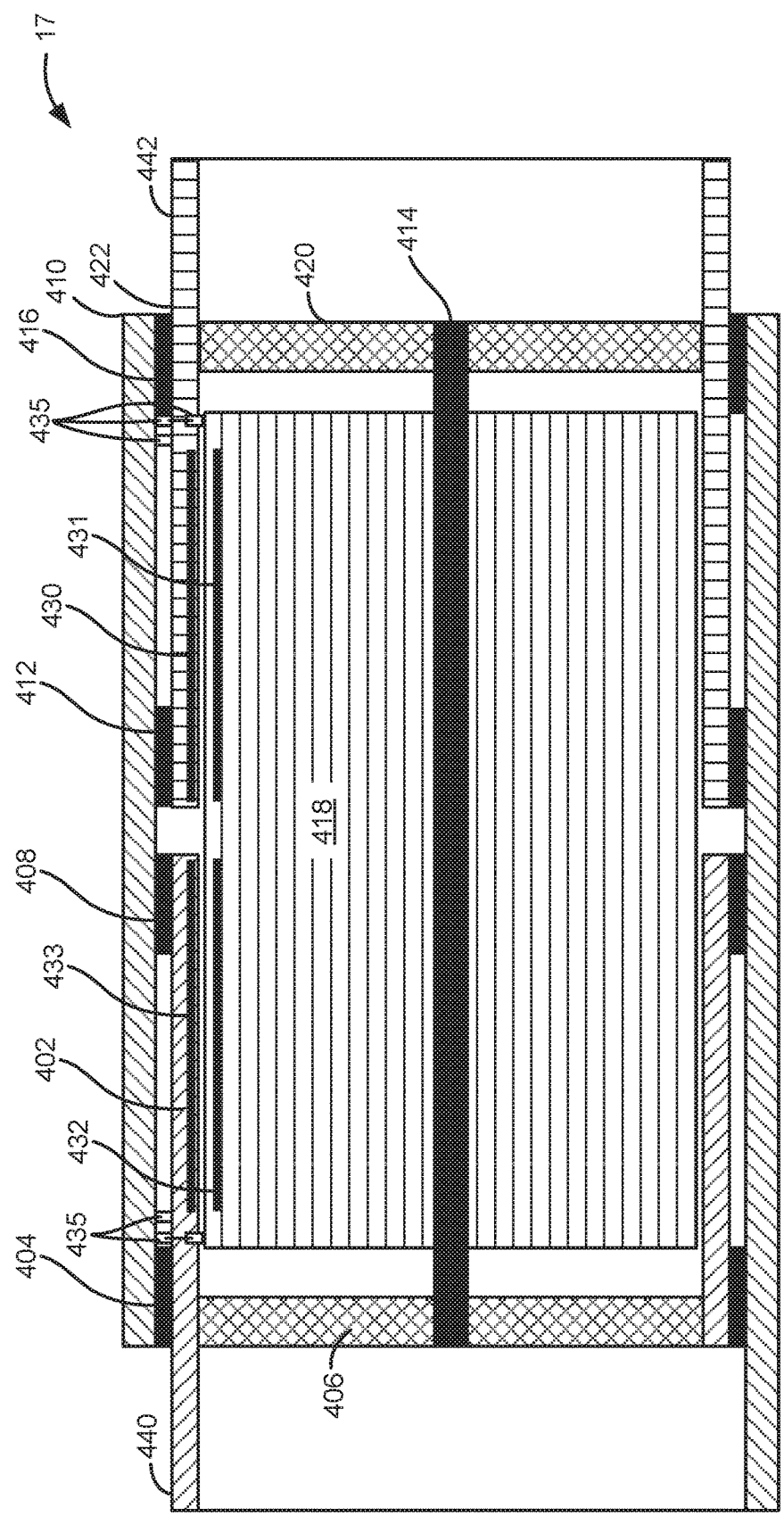
Figure 5:
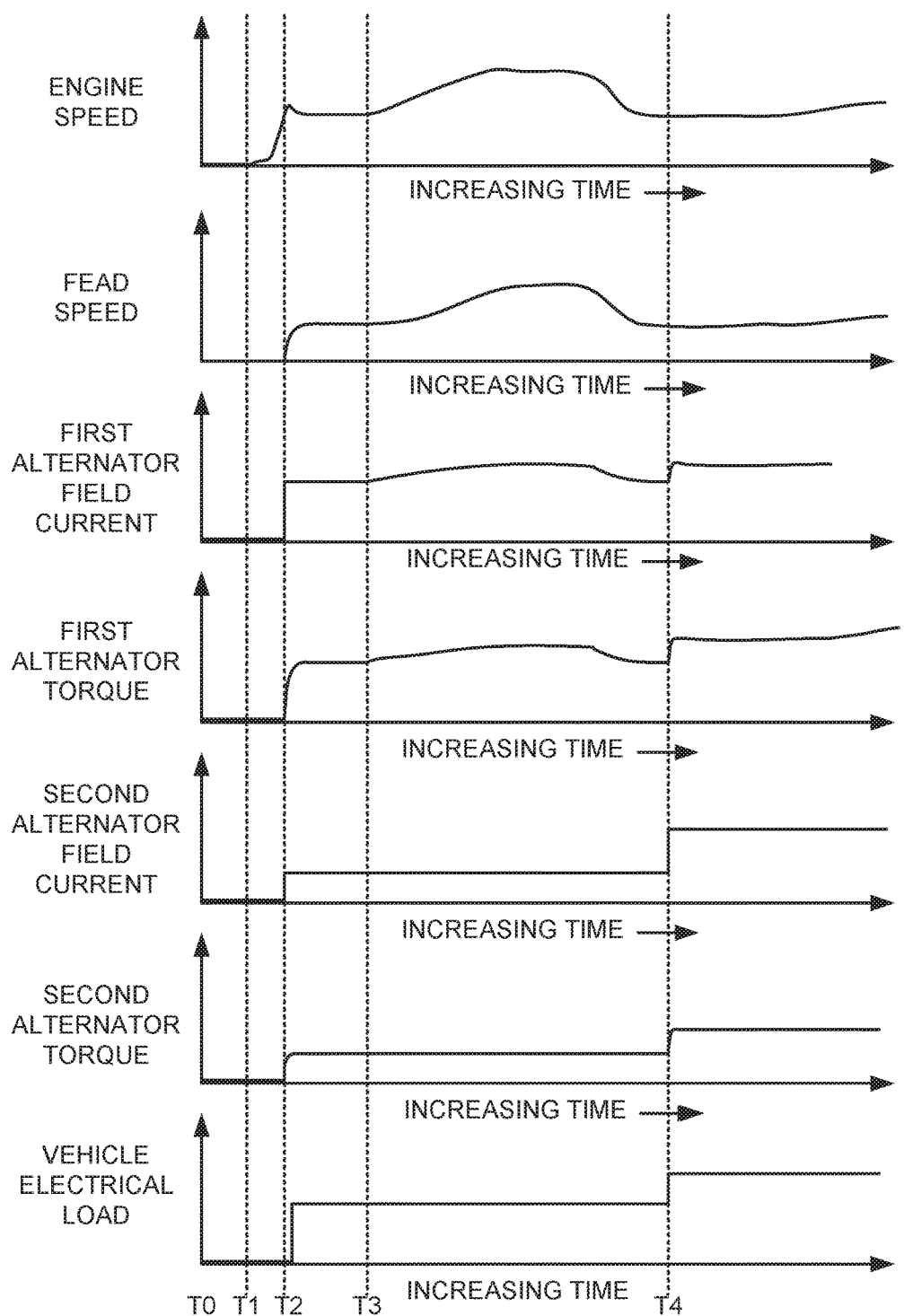
FIG. 5 is an example engine operating sequence according to the method of FIG. 6.

Referring now to FIGS. 4A and 4B, another alternative alternator/starter is shown. This example alternator/starter may operate with fewer moving parts while performing the same functionality as the alternators/starters shown in FIGS. 2A-3B. Further, this alternative provides for input and output pulleys on opposite sides of the alternator/starter so that vehicle packaging may be improved.

Bearings 404, 408, 412, and 416 are pressed into housing 410 to provide support for first field winding support 402 and second armature winding support 422. Bearings 406 and 420 are pressed into first field winding support 402 and second armature winding support 422 to provide support for shaft 414. Shaft 414 provides support for armature and field winding support 418. Pulley 440 may be mechanically coupled to engine 10 and pulley 442 may be mechanically coupled to FEAD devices via a belt or chain.

First field winding 433 is coupled to first field winding support 402. First armature winding 432 is coupled to armature and field winding support 418. Second field winding 431 is also coupled to armature and field winding support 418. Second armature winding 430 is coupled to second armature winding support 422. Slip rings 435, or alternatively brushes or conductive grease through bearing contacts, provide electrical connections between rotating field windings and armature windings and housing 410 where an electrical connector (not shown) provides an electrical coupling between alternator/starter 17 and controller 12.

It should be noted that in some examples second field winding 431 may instead be configured as a second armature winding. Further, second armature winding 430 may instead be configured as a second field winding when second field winding 431 is configured as a second armature winding. The second field winding 431 and second armature winding 430 comprise a second alternator/starter within alternator/starter 17. Likewise, first field winding 433 may instead be configured as a second armature winding. Further, first armature winding 432 may instead be configured as a first field winding when first field winding 433 is configured as a first armature winding. The first field winding 433 and first armature winding 432 comprise a first alternator/starter within alternator/starter 17. Thus, alternator/starter 17 is a compound electrical machine comprised of a first alternator/starter and a second alternator/starter.

Armature and field support 418, first field support 402, and second armature support 422 do not rotate when there is zero current flow through first field winding 431 and first field support 402 is driven by engine 10. However, by flowing current through first field winding 433 when first field support 402 is rotated by engine 10 of FIG. 1A, a voltage may be induced in first armature winding 432. The induced voltage in the first armature winding 432 may be used to supply electrical power to an electric energy storage device or vehicle electrical consumers. Further, flowing field current in first field winding 433 produces a magnetic field which provides a counter torque to engine rotation. The counter torque also causes the armature and field support 418 to rotate when a voltage is induced in the first armature winding 432. Consequently, second field 431 also rotates. If current is supplied to second field winding 431 while the armature and field support 418 is rotated by the counter torque produced via the first field winding 433 current, a magnetic field is generated which provides a counter torque to rotate second armature support 422. The induced voltage in the second armature winding 430 may be used to supply electrical power to an electric energy storage device or vehicle electrical consumers. Second armature winding support 422 does not rotate if field current does not flow through second field winding 431.

Pulley 440 is shown as having a same diameter than pulley 442, but the pulley diameters may be made different depending on design objectives and a desired speed range of mechanically driven accessory devices.

If pulley 440 is driven via engine 10, pulley 442 may provide torque to FEAD devices when current is supplied to field winding 433 and field winding 431. In this condition, voltage induced in winding 432 and winding 430 may be supplied to the vehicle electrical system for electric energy storage device charging and operating vehicle electrical loads.

Figure 4C:
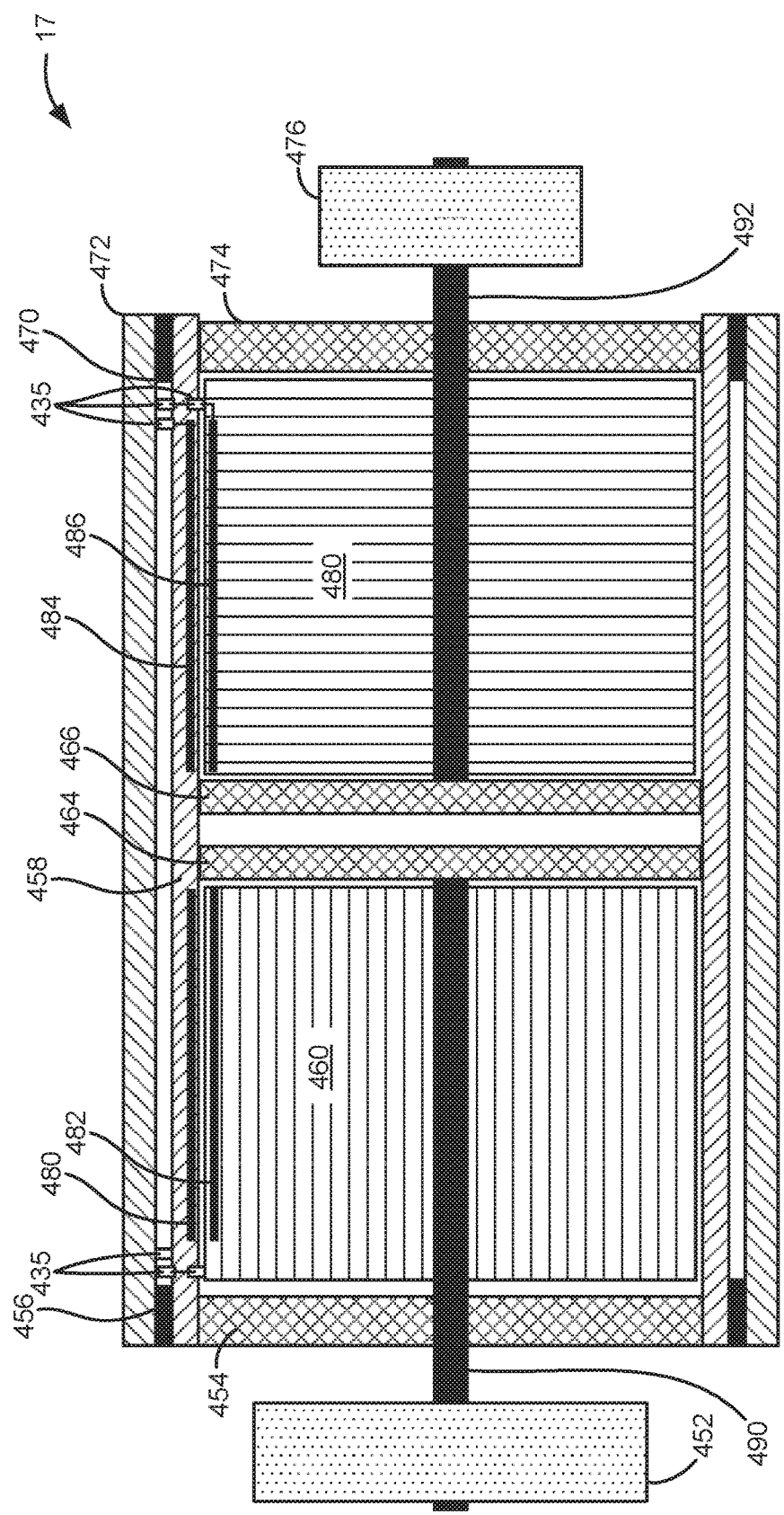

Referring now to FIG. 4C, another alternative alternator/starter is shown. This example alternator/starter may also operate with fewer moving parts while performing the same functionality as the alternators/starters shown in FIGS. 2A-3B. Further, this alternative also provides for input and output pulleys on opposite sides of the alternator/starter so that vehicle packaging may be improved.

Bearings 456 and 470 are pressed into housing 472 to provide support for field and armature winding support 458. Bearings 454, 464, 466, and 474 are pressed into field and armature support 458 to provide support for shaft 490 and shaft 492. Shaft 490 provides support for first armature support 460 and pulley 452. Shaft 492 provides support for second field support 480 and pulley 476. Pulley 452 may be mechanically coupled to engine 10 and pulley 476 may be mechanically coupled to FEAD devices via a belt or chain.

First field winding 480 is coupled to field and armature winding support 458. First armature winding 482 is coupled to first armature support 460. Second field winding 486 is coupled to second field winding support 480. Second armature winding 484 is coupled to field and armature winding support 458. Slip rings 435, or alternatively brushes or conductive grease through bearing contacts, provide electrical connections between rotating field windings and armature windings and housing 472 where an electrical connector (not shown) provides an electrical coupling between alternator/starter 17 and controller 12.

It should be noted that in some examples second field winding 486 may instead be configured as a second armature winding. Further, second armature winding 484 may instead be configured as a second field winding when second field winding 486 is configured as a second armature winding. The second field winding 486 and second armature winding 484 comprise a second alternator/starter within alternator/starter 17. Likewise, first field winding 480 may instead be configured as a second armature winding. Further, first armature winding 482 may instead be configured as a first field winding when first field winding 480 is configured as a first armature winding. The first field winding 480 and first armature winding 482 comprise a first alternator/starter within alternator/starter 17. Thus, alternator/starter 17 is a compound electrical machine comprised of a first alternator/starter and a second alternator/starter.

Armature and field support 458, first armature support 460, and second field support 480 do not rotate when there is zero current flow through first field winding 480 and field the and armature support 458 is driven by engine 10. However, by flowing current through first field winding 480 when first armature support 460 is rotated by engine 10 of FIG. 1A, a voltage may be induced in first armature winding 482. The induced voltage in the first armature winding 482 may be used to supply electrical power to an electric energy storage device or vehicle electrical consumers. Further, flowing field current in first field winding 480 produces a magnetic field which provides a counter torque to engine rotation. The counter torque also causes the armature and field support 458 to rotate when a voltage is induced in the first armature winding 480. Consequently, second armature winding 484 also rotates. If current is supplied to second field winding 486 while the armature and field support 458 is rotated by the counter torque produced via the first field winding 480 current, a magnetic field is generated which provides a counter torque to rotate second field support 480. The induced voltage in the second armature winding 486 may be used to supply electrical power to an electric energy storage device or vehicle electrical consumers. Second field winding support 480 does not rotate if field current does not flow through second field winding 486.

Pulley 452 is shown as having a larger diameter than pulley 476, but the pulley diameters may be made the same or pulley 476 may have a greater diameter than pulley 452 depending on design objectives and a desired speed range of mechanically driven accessory devices.

If pulley 452 is driven via engine 10, pulley 476 may provide torque to FEAD devices when current is supplied to field winding 480 and field winding 486. In this condition, voltage induced in winding 482 and winding 484 may be supplied to the vehicle electrical system for electric energy storage device charging and operating vehicle electrical loads.

Thus, the system of FIGS. 1A-4C provides for an electrical machine, comprising: a housing; a first field winding within the housing; a first armature winding; a second field winding, the first field winding and the first armature winding at least partially wrapped by the second field winding; a second armature winding, the first field winding and the first armature winding at least partially wrapped by the second armature winding; and a controller including non-transitory instructions to adjust current supplied to the second field winding to control a speed of a front end accessory device. The electrical machine includes where the front end accessory device is an air conditioner compressor. The electrical machine includes where the front end accessory device is a water pump.

In some examples, the electrical machine further comprises additional instructions to adjust current supplied to the first field winding based on electrical energy consumed via vehicle electrical consumers. The electrical machine includes where vehicle electrical consumers include a heat pump compressor. The electrical machine further comprises additional instructions to increase a field current of the second field winding in response to speed of the front end accessory device being less than is desired. The electrical machine further comprises additional instructions to decrease a field current of the second field winding in response to speed of the front end accessory device being greater than is desired.

The system of the system of FIGS. 1A-4C also provides an electrical machine, comprising: a housing; a first field winding supported via a first field winding support in the housing; a first armature winding; a second field winding; a second armature winding, the second armature winding supported via a second armature winding support, the second armature winding support mechanically coupled to the first field winding support, the second armature winding at least partially wrapped by the second field winding; and a controller including non-transitory instructions to adjust field current supplied to the first field winding and current supplied to the second field winding in response to a front end accessory drive load.

The electrical machine further comprises additional instructions to adjust field current supplied to the first field winding and current supplied to the second field winding in response to a load applied to the electrical machine via vehicle electrical consumers.

The electrical machine includes where the field current is adjusted to provide an amount of electrical power output from the first armature winding to be equivalent to an amount of mechanical power delivered to a front end accessory device and an amount of electrical power delivered to the vehicle electrical consumers via the second armature winding. The electrical machine further comprises additional instructions to adjust current supplied to the first field winding and the second field winding to provide a desired speed of a front end accessory device. The electrical machine further comprises additional instructions to increase field current supplied to the second field winding in response to an increase in electrical power consumed via vehicle electrical power consumers. The electrical machine further comprises additional instructions to decrease field current supplied to the second field winding in response to a decrease in electrical power consumed via vehicle electrical power consumers The electrical machine further comprises a pulley mechanically coupled to an engine crankshaft.

In some examples, the system provides for an electrical machine, comprising: a housing; a first field winding within the housing; a first armature winding; a second field winding; a second armature winding, the first armature winding and the second armature winding supported via a sole armature winding support; and a controller including non-transitory instructions to divide an output of two alternators comprising the electrical machine such that a first alternator of the electric machine outputs a same amount of power to devices external to the electric machine as a second alternator of the electric machine.

The electrical machine includes where devices external to the electric machine include front end accessory devices and electrical consumers. The electrical machine includes where the first alternator is mechanically coupled to an engine. The electrical machine includes where the second alternator is mechanically coupled to from end accessory devices. The electrical machine further comprises additional instructions to increase power output of the first alternator and the second alternator in response to an increase in electrical consumption via vehicle electrical consumers. The electrical machine further comprises additional instructions to decrease power output of the first alternator and the second alternator in response to a decrease in electrical consumption via vehicle electrical consumers.

Figure 6:
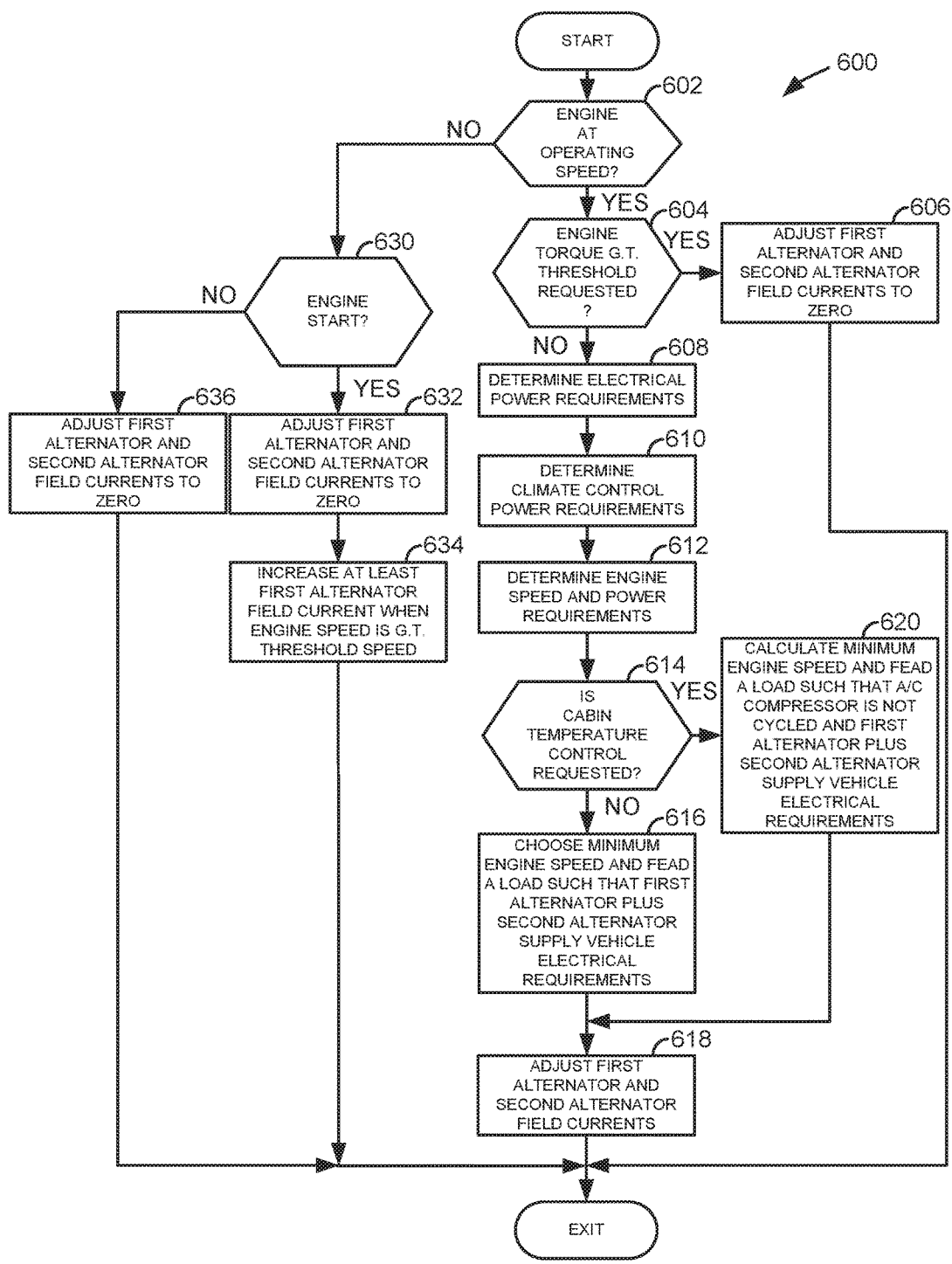
FIG. 6 shows an example method for operating an alternator/starter.

Referring now to FIG. 5, an example engine and alternator operating sequence according to the method of FIG. 6 and the system of FIGS. 1A-4C is shown. The sequence of FIG. 5 is merely one example simulated sequence that may be provided by the method of FIG. 6. In this example, current in the field windings within alternator 17 are adjusted to adjust the torque applied to the engine and control FEAD device speed. However, it alternative embodiments armature winding current may be controlled in place of field winding current.

The first plot from the top of FIG. 5 is a plot of engine speed versus time. The vertical axis represents engine speed and engine speed increases in the direction of the vertical axis arrow. The horizontal axis represents time and time increases from the left side of FIG. 5 to the right side of FIG. 5.

The second plot from the top of FIG. 5 is a plot of FEAD device speed versus time. The vertical axis represents FEAD device speed and FEAD device speed increases in the direction of the vertical axis arrow. The horizontal axis represents time and time increases from the left side of FIG. 5 to the right side of FIG. 5.

The third plot from the top of FIG. 5 is a plot of the first alternator field current in the alternator 17 versus time. The vertical axis represents first alternator field current and first alternator field current increases in the direction of the vertical axis arrow. The horizontal axis represents time and time increases from the left side of FIG. 5 to the right side of FIG. 5.

The fourth plot from the top of FIG. 5 is a plot of the first alternator torque in the alternator 17 versus time. The vertical axis represents first alternator torque and first alternator field torque increases in the direction of the vertical axis arrow. The horizontal axis represents time and time increases from the left side of FIG. 5 to the right side of FIG. 5. The first alternator torque may be a sum of torque applied to the engine to rotate the second alternator within alternator 17 and provide electrical output from the first alternator.

The fifth plot from the top of FIG. 5 is a plot of the second alternator field current in the alternator 17 versus time. The vertical axis represents second alternator field current and second alternator field current increases in the direction of the vertical axis arrow. The horizontal axis represents time and time increases from the left side of FIG. 5 to the right side of FIG. 5.

The sixth plot from the top of FIG. 5 is a plot of the second alternator torque in the alternator 17 versus time. The vertical axis represents second alternator torque and first alternator torque increases in the direction of the vertical axis arrow. The horizontal axis represents time and time increases from the left side of FIG. 5 to the right side of FIG. 5. The second alternator torque may be a sum of torque applied to the first alternator and torque to rotate the FEAD devices.

The seventh plot from the top of FIG. 5 is a plot of vehicle electrical load or amount of electrical energy consumed by the vehicle versus time. The vertical axis represents vehicle electrical load and vehicle electrical load increases in the direction of the vertical axis arrow. The horizontal axis represents time and time increases from the left side of FIG. 5 to the right side of FIG. 5.

At time T0, the engine is not operating and the FEAD device speed is zero. Further, since engine speed is zero alternator input speed (not shown) is zero. The first alternator field current is zero so that the alternator output that is coupled to the FEAD does not rotate. The first alternator of alternator/starter 17 does not provide torque when the first alternator field current is zero. The second alternator field current is zero which does not make rotation of the FEAD output pulley possible. The second alternator of alternator/starter 17 does not provide torque when the second alternator field current is zero. The vehicle electrical load is at a low value.

At time T1, the vehicle driver (not shown) requests the engine to start. The engine speed begins to increase in response to the requested engine start. The engine speed is increased via an engine starter. The FEAD speed is zero since the first and second alternator field currents are zero. The first and second alternator torque values are also zero since the first and second alternator field currents are zero. The vehicle electrical loads other than the engine starter are at a low value.

Between time T1 and time T2, the engine speed continues to increase as the engine begins to produce torque. The FEAD speed remains zero as do the first alternator field current, the second alternator field current, the first alternator torque, and the second alternator torque. The vehicle electrical load remains at a low value.

At time T2, the engine speed reaches a threshold speed. In one example, the threshold speed is a base engine idle speed. Electrical currents are applied to the first alternator field and the second alternator field as discussed in further detail in the method of FIG. 6. In this example, a greater current is supplied to the field of the first alternator than to the field of the second alternator. The torque of the first alternator increases, thereby increasing the mechanical load the alternator 17 applies to engine 10. The torque of the second alternator also increases indicating the torque used to rotate FEAD devices and provide electrical output from the second alternator in alternator 17. The vehicle electrical load is increased after current is supplied to the first alternator field winding and the second alternator field winding so as to activate various vehicle electrical consumers.

At time T3, engine speed begins to increase. The first alternator field current and the second alternator field current are adjusted responsive to engine speed and a desired FEAD device speed. The desired FEAD device speed may be a speed where the FEAD device exhibits greater efficiency than a threshold efficiency. Further, the first and second alternator field currents are adjusted to provide a desired amount of electrical output. The desired amount of electrical output may be based on the electrical power consumed by vehicle electrical power consumers and an amount of power provided to the electrical energy storage device.

The first and second alternator field currents are adjusted responsive to engine speed, electrical power consumed by electrical power consumers, desired FEAD device speed, and the amount of electrical power provided from the alternator to the vehicle's electrical energy storage device.

At time T4, the vehicle electrical load is increased. In one example, the vehicle's electrical load may be increased in response to activate autonomous vehicle operation. In other examples, the vehicle's electrical load may be increased due to activating a vehicle heat pump or other electrical load. In this example, the first alternator field current is maintained at its present value and the second alternator field current is increased so as to increase electrical power output by the second alternator in alternator/starter 17. The torque of the first and second alternators is increased so that additional electrical energy may be provided via the second alternator in alternator/starter 17. In particular, the mechanical load of the first alternator is increased by increasing the field current supplied to the first alternator. The increased field current supplied to the first alternator allows the first alternator to rotate the second alternator with additional torque. The electrical load of the second alternator is increased, thereby increasing the second alternator torque applied to the first alternator and the engine. Increasing the field current supplied to the field windings of the second alternator also increase the electrical output from the second alternator.

Referring now to FIG. 6, a method for operating a vehicle that includes a compound alternator is shown. The method of FIG. 6 may provide the operating sequence shown in FIG. 5. Further, at least portions of the method of FIG. 6 may be incorporated as executable instructions (e.g., computer code) stored in non-transitory memory of controller 12 shown in FIG. 1B while other portions of the method may be performed via a controller transforming operating states of devices and actuators in the physical world. The alternator/starter described in the method of FIG. 6 may be configured as one of the alternators/starters described in FIGS. 2A-4C.

At 602, method 600 judges if the engine is operating at or at a speed greater than a threshold operating speed. In one example, the threshold operating speed may be a base engine idle speed. Method 600 may determine engine speed via an engine speed sensor. If method 600 judges that engine speed is greater than the threshold speed, the answer is yes and method 600 proceeds to 604. Otherwise, the answer is no and method 600 proceeds to 630.

At 630, method 600 judges if the engine is being started. In one example, method 600 judges that the engine is being started is engine speed is greater than zero and less than a threshold speed (e.g., base engine idle speed). If method 600 judges that the engine is being started, the answer is yes and method 600 proceeds to 632. Otherwise, the answer is no and method 600 proceeds to 636.

At 636, method 600 adjusts current supplied to a first field winding of the alternator/starter and current supplied to a second field winding of the alternator/starter to zero. The current supplied to the first and second field windings of the alternator/starter is adjusted to zero amperes when the engine is stopped so that electrical energy consumption is reduced.

During engine stopping, current supplied to the field windings of the first alternator may be adjusted to a first amount and current supplied to the field windings of the second alternator may be adjusted to a second amount different than the first amount. In one example, current supplied to the field windings of the first alternator driven by the engine is non-zero so that a load may be applied to the so that engine speed control may be improved and so engine stopping position may be controlled. The current supplied to the field windings of the second alternator may be zero so that FEAD device loads that vary with FEAD speed may be decoupled from the engine to improve engine stopping position control during engine stopping. Thus, the first alternator's electrical load may be used to control engine speed and stopping position while the second alternator's influence on engine stopping position is reduced. Method 600 proceeds to exit after current supplied to the first and second field windings of the alternator is adjusted.

At 632, method 600 adjusts current supplied to a first field winding of the alternator/starter and current supplied to a second field winding of the alternator/starter to zero. The current supplied to the first and second field windings of the alternator/starter is adjusted to zero amperes so that the mechanically driven FEAD devices are not rotated during engine starting. Additionally, by adjusting the current supplied to the first and second field windings of the alternator/starter to zero amperes eliminates torque applied to the engine to produce electrical energy via the alternator/starter. Consequently, it may be possible to improve engine speed control during engine starting since engine load may be more consistent. Method 600 proceeds to 634 after current supplied to the first and second fields of the alternator is adjusted.

In some examples, the alternator/starter may be operated as a starter in response to an engine start request. The alternator/starter is operated as a starter by supplying current to the first field windings and voltage to the first armature windings. Current and voltage may not supplied to the second field windings and the second armature windings when the alternator/starter is operated as a starter since rotation of FEAD devices would increase current consumption. The alternator/starter rotates the engine until a predetermined engine speed is exceeded (e.g., 250 RPM), then the alternator/starter may be operated as an alternator. Method 600 proceeds to exit after the first and second alternator field currents are adjusted.

At 634, method 600 operates the alternator/starter 17 as an alternator and increases field current to alternator/starter when engine speed is greater than (G.T.) a threshold speed. By increasing the field current of at least one alternator of alternator/starter 17, electrical energy output by alternator/starter 17 may be increased. Method 600 proceeds to exit after field current of alternator/starter 17 is increased and alternator/starter 17 begins producing electrical energy.

At 604, method 600 judges if an amount of requested engine torque is greater than a threshold. In one example, the threshold is seventy five percent of maximum engine torque at the present engine speed. Method 600 makes this determination to provide a maximum amount of engine power during high load conditions so that driver demand torque may be met by the engine. If the answer is yes, method 600 proceeds to 606. Otherwise, the answer is no and method 600 proceeds to 608.

At 606, method 600 adjusts current supplied to a first field winding of the alternator/starter and current supplied to a second field winding of the alternator/starter to zero. The current supplied to the first and second field windings of the alternator/starter is adjusted to zero amperes so that the mechanically driven FEAD devices are not rotated and electrical energy is not output from the alternator/starter during driver demand conditions greater than a threshold. Consequently, it may be possible to increase an amount of power delivered to vehicle wheels. Method 600 proceeds to exit after current supplied to the first and second fields of the alternator is adjusted.

At 608, method 600 determines electrical power requirements for the vehicle. The vehicle electrical requirements may include but are not limited to navigation devices, vehicle actuators and sensors for autonomous vehicle driving, vehicle entertainment systems, vehicle communications systems, vehicle passenger cabin climate control electrical power consumption, and vehicle lighting. In one example, power values corresponding to the type of electrical load are empirically determined and stored in functions or tables in memory. For example, if a vehicle heat pump is activated, method 600 may retrieve an electrical load (e.g., an amount of electrical power) value from memory to determine the electrical load provided by the vehicle heat pump. Alternatively, power for vehicle electrical consumers may be measured via a current sense resistor or other known current measurement means. The sensed current is multiplied by the voltage at which the current is provided to determine electrical power consumed by vehicle electrical devices. Power values for all vehicle electrical consumers are summed to determine a total vehicle electrical power requirement. Method 600 proceeds to 610 after determining vehicle electrical power requirements.

At 610, method 600 determined mechanical power requirements for a vehicle climate control system, if the vehicle is so equipped. In one example, power requirement values for a mechanically driven compressor (e.g., driven via the vehicle engine) are empirically determined and stored into memory. The power values may be retrieved from memory if the vehicle's climate control system is activated.

At 612, method 600 determines engine speed and the engine power requirement. The engine speed (e.g., Rev/min) may be determined via a crankshaft position sensor and measuring an amount of time between known crankshaft positions. The engine power requirement (e.g., requested engine power) may be determined from a driver demand torque. The driver demand torque may be based on accelerator pedal position and vehicle speed. A function stored in memory relates or may be used to convert accelerator pedal position and vehicle speed into driver demand torque. The driver demand torques may be empirically determined and stored in memory in a function or table. Method 600 proceeds to 614 after engine speed and requested engine power are determined.

At 614, method 600 judges if vehicle passenger cabin temperature control is requested. In one example, method 600 judges that vehicle passenger cabin temperature control is requested based on a position of an operator actuator switch. In another example, method 600 judges that vehicle passenger cabin temperature control is requested based on a value of a bit stored in memory. If method 600 judges that vehicle passenger cabin temperature control is requested, the answer is yes and method 600 proceeds to 620. Otherwise, the answer is no and method 600 proceeds to 616.

At 620, method 600 determines a minimum engine speed and FEAD load such that an air conditioning compressor is not turned on and off and on multiple times. In one example, the FEAD load may be empirically determined and stored to a table or function stored in memory. The table or function outputs a power value when indexed via ambient temperature and a desired vehicle passenger cabin temperature. Further, method 600 determines the electrical power to be generated via the first and second alternators of the alternator/starter 17. In one example, the minimum engine speed is a lowest engine speed where a total amount of torque used by the first alternator, second alternator, and FEAD may be provided. The vehicle electrical power requirements may be empirically determined and stored into memory or measured via a shunt resistor for example. If vehicle electrical power requirements are empirically determined and stored to memory, they may be based on the electrical device activated. For example, autonomous vehicle controls may consume 1500 W of electrical energy and an electric water pump may consume 50 W of electrical energy. A table or function representing autonomous vehicle control energy may output the value of 1500 when the autonomous vehicle controls are activated. The FEAD mechanical loads and the electrical loads are added together and the result is divided by 2 as indicated in the previous five example scenarios to determine the output from the first and second alternators that comprise alternator/starter 17. The second alternator load is then separated into mechanical load (FEAD) and electrical load. If electrical output of one alternator is a negative value, that alternator (e.g., the alternator coupled to the FEAD) may be operated as a motor instead of an alternator to balance alternator outputs. In some examples, field current of the second alternator may be adjusted to vary speed of devices coupled to the second alternator. For example, AC compressor speed may be monitored via a speed sensor and if AC compressor speed is less than desired, the field current may be increased. In this way, speed of FEAD devices may be controlled.

At 616, method 600 determines a minimum engine speed and FEAD load to operate FEAD mechanical torque consumers at a desired speed. Additionally, method 600 determines electrical power to be generated via the first and second alternators of the alternator/starter 17. In one example, the FEAD load may be empirically determined and stored to a table or function stored in memory. The table or function outputs a power value when indexed via ambient temperature and a desired vehicle passenger cabin temperature. Further, method 600 determines the electrical power to be generated via the first and second alternators of the alternator/starter 17. In one example, the minimum engine speed is a lowest engine speed where a total amount of torque used by the first alternator, second alternator, and FEAD may be provided. The vehicle electrical power requirements may be empirically determined and stored into memory or measured via a shunt resistor for example. If vehicle electrical power requirements are empirically determined and stored to memory, they may be based on the electrical device activated. The FEAD mechanical loads and the electrical loads are added together and the result is divided by 2 as indicated in the previous five example scenarios to determine the output from the first and second alternators that comprise alternator/starter 17. The second alternator load is then separated into mechanical load (FEAD) and electrical load. If electrical output of one alternator is a negative value, that alternator (e.g., the alternator coupled to the FEAD) may be operated as a motor instead of an alternator to balance alternator outputs. Further, in some examples, field current of the second alternator may be adjusted to vary speed of devices coupled to the second alternator. For example, AC compressor speed may be monitored via a speed sensor and if AC compressor speed is greater than desired, the field current may be decreased. In this way, speed of FEAD devices may be controlled.

At 618, method 600 adjusts field currents for a first alternator and a second alternator of alternator/starter 17. In one example, a first table or function that is indexed by the desired electrical output of the first alternator and the mechanical and electrical power desired output from the first alternator. The first table or function outputs a desired field current for the first alternator. Similarly, a second table or function is indexed by the desired mechanical and electrical power of the second alternator. The second table or function outputs a desired field current for the second alternator. The first and second field currents are output via a controller and method 600 proceeds to exit.

In this way, vehicle electrical loads and mechanical FEAD loads may be allocated between two alternators. One alternator (e.g., the second alternator) supplying torque to FEAD loads. Further, speed of FEAD devices may be controlled via adjusting field current supplied to the devices.

Note that the example control and estimation routines included herein can be used with various engine and/or vehicle system configurations and the various alternator/ starter configurations included herein. The control methods and routines disclosed herein may be stored as executable instructions in non-transitory memory and may be carried out by the control system including the controller in combination with the various sensors, actuators, and other vehicle system hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, at least a portion of the described actions, operations and/or functions may graphically represent code to be programmed into non-transitory memory of the computer readable storage medium in the control system. The control actions may also transform the operating state of one or more sensors or actuators in the physical world when the described actions are carried out by executing the instructions in a system including the various vehicle hardware components in combination with one or more controllers.

This concludes the description. The reading of it by those skilled in the art would bring to mind many alterations and modifications without departing from the spirit and the scope of the description. For example, I3, I4, I5, V6, V8, V10, V12, and boxer engines operating in natural gas, gasoline, diesel, or alternative fuel configurations could use the present description to advantage.

The invention claimed is:

1. An electrical machine, comprising:
   a housing;
   a first field winding within the housing;
   a first armature winding;
   a second field winding, the first field winding and the first armature winding at least partially wrapped by the second field winding;
   a second armature winding, the first field winding and the first armature winding at least partially wrapped by the second armature winding; and
   a controller including non-transitory instructions to adjust current supplied to the second field winding to control a speed of a front end accessory device.

2. The electrical machine of claim 1, where the front end accessory device is an air conditioner compressor.

3. The electrical machine of claim 1, where the front end accessory device is a water pump.

4. The electrical machine of claim 1, further comprising additional instructions to adjust current supplied to the first field winding based on electrical energy consumed via vehicle electrical consumers.

5. The electrical machine of claim 4, where vehicle electrical consumers include a heat pump compressor.

6. The electrical machine of claim 4, further comprising additional instructions to increase a field current of the second field winding in response to speed of the front end accessory device being less than is desired.

7. The electrical machine of claim 4, further comprising additional instructions to decrease a field current of the second field winding in response to speed of the front end accessory device being greater than is desired.

8. An electrical machine, comprising:
   a housing;
   a first field winding supported via a first field winding support in the housing;
   a first armature winding;
   a second field winding;
   a second armature winding, the second armature winding supported via a second armature winding support, the second armature winding support mechanically coupled to the first field winding support, the second armature winding at least partially wrapped by the second field winding; and
   a controller including non-transitory instructions to adjust field current supplied to the first field winding and current supplied to the second field winding in response to a front end accessory drive load.

9. The electrical machine of claim 8, further comprising additional instructions to adjust field current supplied to the first field winding and current supplied to the second field winding in response to a load applied to the electrical machine via vehicle electrical consumers.

10. The electrical machine of claim 9, where the field current is adjusted to provide an amount of electrical power output from the first armature winding to be equivalent to an amount of mechanical power delivered to a front end accessory device and an amount of electrical power delivered to the vehicle electrical consumers via the second armature winding.

11. The electrical machine of claim 8, further comprising additional instructions to adjust current supplied to the first field winding and the second field winding to provide a desired speed of a front end accessory device.

12. The electrical machine of claim 8, further comprising additional instructions to increase field current supplied to the second field winding in response to an increase in electrical power consumed via vehicle electrical power consumers.

13. The electrical machine of claim 12, further comprising additional instructions to decrease field current supplied to the second field winding in response to a decrease in electrical power consumed via vehicle electrical power consumers.

14. The electrical machine of claim 8, further comprising a pulley mechanically coupled to an engine crankshaft.

15. An electrical machine, comprising:
a housing;
a first field winding within the housing;
a first armature winding;
a second field winding;
a second armature winding, the first armature winding and the second armature winding supported via a sole armature winding support; and
a controller including non-transitory instructions to divide an output of two alternators comprising the electrical machine such that a first alternator of the electric machine outputs a same amount of power to devices external to the electric machine as a second alternator of the electric machine.

16. The electrical machine of claim 15, where devices external to the electric machine include front end accessory devices and electrical consumers.

17. The electrical machine of claim 15, where the first alternator is mechanically coupled to an engine.

18. The electrical machine of claim 17, where the second alternator is mechanically coupled to from end accessory devices.

19. The electrical machine of claim 15, further comprising additional instructions to increase power output of the first alternator and the second alternator in response to an increase in electrical consumption via vehicle electrical consumers.

20. The electrical machine of claim 19, further comprising additional instructions to decrease power output of the first alternator and the second alternator in response to a decrease in electrical consumption via vehicle electrical consumers.

* * * * *